(12) United States Patent
Potnis et al.

(10) Patent No.: US 10,310,271 B2
(45) Date of Patent: Jun. 4, 2019

(54) SYSTEMS, DEVICES, AND METHODS EMPLOYING WAVEGUIDES EMBEDDED IN CURVED LENSES

(71) Applicant: THALMIC LABS INC., Kitchener (CA)

(72) Inventors: Shreyas Potnis, Kitchener (CA); Timothy Paul Bodiya, Toronto (CA); Stefan Alexander, Elmira (CA)

(73) Assignee: North Inc., Kitchener, ON (CA)

( * ) Notice: Subject to any disclaimer, the term of this patent is extended or adjusted under 35 U.S.C. 154(b) by 0 days.

(21) Appl. No.: 16/057,429

(22) Filed: Aug. 7, 2018

(65) Prior Publication Data

US 2018/0348526 A1 Dec. 6, 2018

Related U.S. Application Data

(63) Continuation-in-part of application No. 15/946,549, filed on Apr. 5, 2018.

(Continued)

(51) Int. Cl.
| | |
|---|---|
| *G02B 6/34* | (2006.01) |
| *G02B 27/01* | (2006.01) |
| *G02B 27/09* | (2006.01) |
| *F21V 8/00* | (2006.01) |
| *G02B 3/00* | (2006.01) |

(52) U.S. Cl.
CPC ....... *G02B 27/0172* (2013.01); *G02B 3/0087* (2013.01); *G02B 6/003* (2013.01); *G02B 27/0955* (2013.01); *G02B 2003/0093* (2013.01); *G02B 2027/013* (2013.01); *G02B 2027/0107* (2013.01); *G02B 2027/0174* (2013.01); *G02B 2027/0178* (2013.01); *G02B 2027/0196* (2013.01)

(58) Field of Classification Search
CPC .............. G02B 27/0172; G02B 6/0038; G02B 6/0016; G02B 2027/0178; G02C 9/00
See application file for complete search history.

(56) References Cited

U.S. PATENT DOCUMENTS

| | | | |
|---|---|---|---|
| 6,680,802 B1* | 1/2004 | Ichikawa | G02B 27/0172 359/630 |
| 9,578,318 B2* | 2/2017 | Fleck | H04N 13/296 |

(Continued)

*Primary Examiner* — Ellen E Kim
(74) *Attorney, Agent, or Firm* — Thomas Mahon (57) ABSTRACT

Systems, devices, and methods that implement waveguides in curved transparent combiners that are well-suited for use in wearable heads-up displays (WHUDs) are described. Curved transparent combiners employ an optical lens or optical lens blank with a waveguide or light guide embedded therein and with low refractive index materials interposed between one or more major surfaces of the waveguide and the optical lens or blank to facilitate total internal reflection while the waveguide is embedded in the lens. The curved transparent combiners may optionally include in-couplers and/or out-couplers to provide transparent combiners that substantially match a shape, size, and geometry of conventional eyeglass lenses and can, in some implementations, embody prescription curvatures to serve as prescription eyeglass lenses. The waveguides and in-/out-couplers are planar or curved depending on the implementation. WHUDs that employ such curved transparent combiners are also described.

18 Claims, 7 Drawing Sheets

Related U.S. Application Data

(60) Provisional application No. 62/482,062, filed on Apr. 5, 2017.

(56) References Cited

U.S. PATENT DOCUMENTS

| | | | |
|---|---|---|---|
| 9,989,767 B2* | 6/2018 | Dobschal | G02B 27/0172 |
| 2007/0008624 A1* | 1/2007 | Hirayama | G02B 27/0081 |
| | | | 359/630 |
| 2008/0117341 A1* | 5/2008 | McGrew | G02B 26/08 |
| | | | 348/766 |
| 2013/0242555 A1* | 9/2013 | Mukawa | G02B 3/0006 |
| | | | 362/237 |
| 2013/0322810 A1* | 12/2013 | Robbins | G02B 5/30 |
| | | | 385/11 |
| 2016/0266388 A1* | 9/2016 | Dobschal | G02C 7/086 |
| 2016/0270656 A1* | 9/2016 | Samec | A61B 3/085 |

* cited by examiner

SYSTEMS, DEVICES, AND METHODS EMPLOYING WAVEGUIDES EMBEDDED IN CURVED LENSES

TECHNICAL FIELD

The present systems, devices, and methods generally relate to integrating waveguides with curved lenses, and also relate to systems, devices, and methods that employ curved lenses with waveguides embedded therewith in wearable heads-up displays.

BACKGROUND

Description of the Related Art

Wearable Heads-Up Displays

A head-mounted display is an electronic device that is worn on a user's head and, when so worn, secures at least one electronic display within a viewable field of at least one of the user's eyes. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. The "combiner" component of a wearable heads-up display is the physical structure where display light and environmental light merge as one within the user's field of view. The combiner of a wearable heads-up display is typically transparent to environmental light but includes some optical routing mechanism to direct display light into the user's field of view.

Examples of wearable heads-up displays include: the Google Glass®, the Optinvent Ora®, the Epson Moverio®, and the Microsoft Hololens® just to name a few.

Optical Waveguides in Wearable Heads-Up Displays

A majority of currently available wearable heads-up displays employ optical waveguide systems in the transparent combiner. An optical waveguide operates under the principle of total internal reflection (TIR). TIR occurs when light remains in a first medium upon incidence at a boundary with a second medium because the refractive index of the first medium is greater than the refractive index of the second medium and the angle of incidence of the light at the boundary is above a specific critical angle that is a function of those refractive indices. Optical waveguides employed in wearable heads-up displays like those mentioned above typically consist of rectangular prisms of material with a higher refractive index then the surrounding medium, usually air (Google Glass®, Optinvent Ora®, Epson Moverio®) or a planar lens (Microsoft Hololens®). Light input into the prism will propagate along the length of the prism as long as the light continues to be incident at boundaries between the prism and the surrounding medium at an angle above the critical angle. Optical waveguides employ in-coupling and out-coupling elements to ensure that light follows a specific path along the waveguide and then exits the waveguide at a specific location in order to create an image that is visible to the user.

The optical performance of a wearable heads-up display is an important factor in its design. When it comes to face-worn devices, however, users also care significantly about aesthetics. This is clearly highlighted by the immensity of the eyeglasses (including sunglasses) frame industry. Independent of their performance limitations, many of the aforementioned examples of wearable heads-up displays have struggled to find traction in consumer markets because, at least in part, they lack fashion appeal. Most wearable heads-up displays presented to date employ planar waveguides in planar transparent combiners and, as a result, appear very bulky and unnatural on a user's face compared to the more sleek and streamlined look of typical curved eyeglass and sunglass lenses. There is a need in the art to integrate curved lenses with waveguides in wearable heads-up displays or eyewear in order to achieve the form factor and fashion appeal expected of the eyeglass and sunglass frame industry.

BRIEF SUMMARY

A transparent combiner may be used for various types of displays, for example used in a wearable heads-up display. It may be desirable to integrate a light guide/waveguide with a lens to produce a transparent combiner. It may also be desirable to integrate a light guide/waveguide with a lens having one or more curved major surfaces, either for aesthetic appeal and/or to impart an optical power to light passing through the lens, for example where the lens is a curved prescription lens.

Suitable light guides or waveguides may be planar, and preferably sufficiently thin (less than or equal to approximate 0.3 mm, where approximately means plus or minus 10%) that the light guides or waveguides can fit inside a curved volume of the lens over at least most of a length of the lens. This constraint can impose some restrictions on how thin the lens can be, and how much curvature/prescription can be accommodated.

Light guides or waveguides typically rely on total internal reflection (TIR) to propagate light along a dimension (e.g., longitudinal dimension) of the light guide or waveguide. TIR in a light guide or waveguide typically occurs for light entering at or greater than some critical angle, and relies on two factors: i) the reflection angle(s) of the light being propagated within the light guide or waveguide, and ii) an interface between the major surfaces of the light guide or waveguide and an external environment. More specifically, TIR within a light guide or waveguide relies on a ratio between an index of refraction of the material that comprises the light guide or waveguide and an index of refraction of a medium or material immediately outside of the light guide or waveguide.

When incorporating a light guide or waveguide inside a lens (e.g., a prescription lens), the interface relevant to TIR is the interface between the major surfaces of the light guide or waveguide and the material that forms the lens. The lens material may have an index of refraction that is relatively high, which reduces the ratio to a point that TIR will not occur in the light guide or waveguide, and light injected into the light guide or waveguide at or greater than the typical critical angle will escape rather than propagating along the light guide or waveguide.

In at least some implementations, a solution to the problem presented by incorporating a light guide or waveguide into a lens employs application of a low index material at major interfaces between the light guide or waveguide and the lens. Various low index materials may be employed, for example a sol-gel. In some instances, the low index material may be an adhesive or epoxy.

A wearable heads-up display (WHUD) may be summarized as including a support structure that in use is worn on a head of a user; a display light source to provide display light; and a transparent combiner carried by the support structure and positioned in a field of view of an eye of the user when the support structure is worn on the head of the user, the transparent combiner comprising: a lens having a first major surface and a second major surface, the second major surface of the lens opposed from the first major surface of the lens across a thickness of the lens, at least one of the first or the second major surfaces of the lens having a curvature that imparts at least one of a positive optical power or a negative optical power; a planar waveguide having a first major surface and at least a second major surface, the second major surface of the planar waveguide opposed from the first major surface the planar waveguide across a thickness of the planar waveguide, the planar waveguide; and a first layer of a low reflective index material located between at least a portion of the first major surface of the lens and at least a portion of the first major surface of the planar waveguide.

The transparent combiner may further include a second layer of a low reflective index material located between at least a portion of the second major surface of the lens and at least a portion of the second major surface of the planar waveguide. The display light source may include a first source of a red light, a second source of a green light and a third source of a blue light, each of the first, the second and the third sources positioned and oriented to transmit the red, the green and the blue light to the transparent combiner.

BRIEF DESCRIPTION OF THE SEVERAL
VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one implementation" or "an implementation" or "one embodiment" or "an embodiment" means that a particular feature, structures, or characteristics may be combined in any suitable manner in one or more implementation or embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The terms light guide, waveguide and waveguide substrate are used interchangeably herein and in the claims to refer to an optical substrate that can propagate at least certain wavelengths of light received at angles equal to or greater than a critical angle along a dimension (e.g., length) of the optical substrate.

The headings and Abstract of the Disclosure provided herein are for convenience only and do not interpret the scope or meaning of the embodiments.

The various embodiments described herein provide systems, devices, and methods for lenses with waveguides integrated therewith, for example curved lenses with planar waveguides, for instance curved eyeglass or eyewear prescription lenses. Lenses with waveguides embedded therewith are particularly well-suited for use as or in the transparent combiner of wearable heads-up displays ("WHUDs") in order to enable the WHUDs to adopt more aesthetically-pleasing styles and, in some implementations, to enable the WHUDs to include prescription lenses. Examples of WHUD systems, devices, and methods that are particularly well-suited for use in conjunction with the present systems, devices, and methods for curved lenses with waveguides (e.g., planar waveguides) are described in, for example, U.S. Non-Provisional patent application Ser. No. 15/167,458 (now US Patent Application Publication No. US 2016-0349514 A1), U.S. Non-Provisional patent application Ser. No. 15/167,472 (now US Patent Application Publication No. US 2016-0349515 A1), U.S. Non-Provisional patent application Ser. No. 15/167,484 (now US Patent Application Publication No. US 2016-0349516 A1), US Patent Application Publication No. US 2016-0377865 A1, US Patent Application Publication No. US 2016-0377866 A1, and US Patent Application Publication No. US 2016-0238845 A1.

Figure 1A:
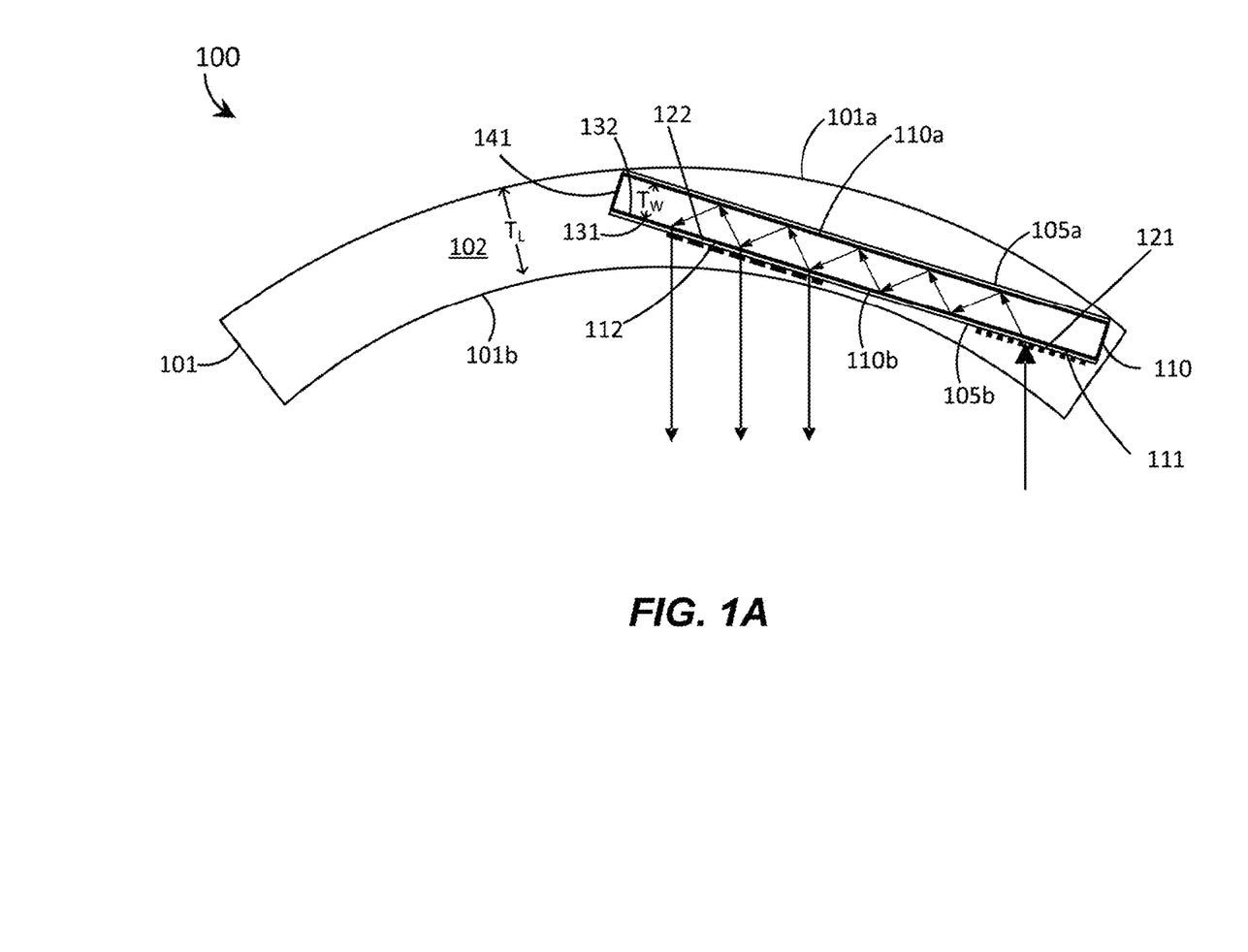
FIG. 1A is a sectional view showing a transparent combiner for use in a wearable heads-up display in accordance with an illustrated implementation of the present systems, devices, and methods, in which in-coupler and out-couplers reside outside a low refractive index material layer.
Figure 1B:
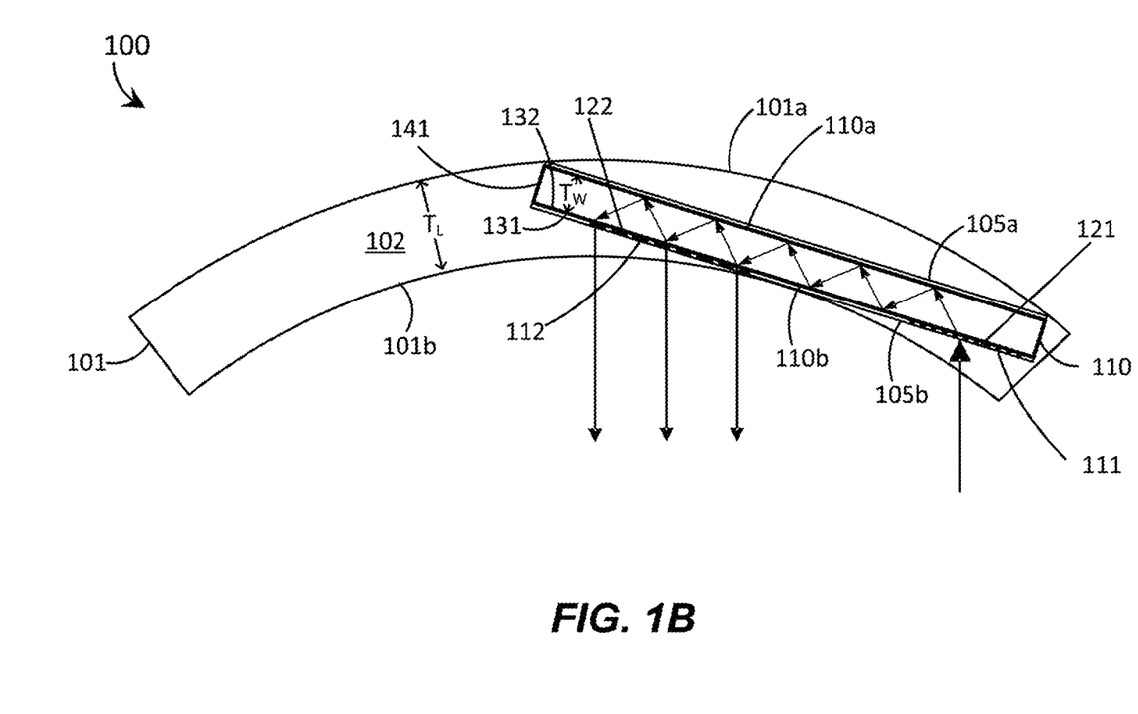
FIG. 1B is a sectional view showing a transparent combiner for use in a wearable heads-up display in accordance with an illustrated implementation of the present systems, devices, and methods, in which in-coupler and out-couplers reside under or within a low refractive index material layer.

FIG. 1A shows transparent combiner 100a, which may, for example, be used a WHUD in accordance with the present systems, devices, and methods. FIG. 1B shows transparent combiner 100b, which may, for example, be used a WHUD in accordance with the present systems, devices, and methods. Many of the structures of the transparent combiner 100a of FIG. 1B are similar, or even identical, to those the transparent combiner 100b of FIG. 1A, and are identified by common reference numbers between FIGS. 1A and 1B.

Transparent combiner 100a, 100b includes a lens 101. The lens 101 has a first major surface 101a and a second major surface 101b, the second major surface 101b opposed from the first major surface 101a across a thickness $T_L$ of the lens 101. The first and second major surfaces 101a, 101b are denominated as being major since those major surfaces 101a, 101b constitute the surfaces of the lens 101 with the largest surface areas. In practice, the first and the second major surfaces 101a, 101b are positioned or worn in front of a user's eyes, with a field of vision or view or the user or a line of sight extending generally perpendicularly to the first and second major surfaces 101a, 101b, at least when a gaze of the user is straight ahead. Either or both of the first and the second major surfaces 101a, 101b may be non-planar, for example have one or more radii of curvature about one or more axes that are spaced from the respective first or second major surfaces 101a, 101b, the axes typically spaced on an eye proximate side of the lens 101. The resulting curvatures may be simply for aesthetic affect, and/or may provide for a non-zero optical power, for example where the lens takes the form of a prescription lens, for example for prescription eyeglasses or eyewear. Thus, the first and the second major surfaces may be convex, concave or have complex or compound surface geometries, for example to enhance optical power or to correct for any variety of visual aberrations.

The first and the second major surfaces of the lens, along with one or more peripheral edges of the lens 101 define an inner volume 102 of the lens 101. The lens 101 can be formed of a wide variety of materials, including glass, various forms of glass (e.g., borosilicate glass), polycarbonate and other forms of polymers. The structure and methods described herein may advantageously allow a larger range of materials to be employed for the lens 101 than might otherwise be possible.

Transparent combiner 100a, 100b also includes a waveguide or waveguide substrate 110. While illustrated and generally described as a planar waveguide, various implementations are not necessarily limited to planar waveguides. The waveguide 110 has a first major surface 110a and a second major surface 110b, the second major surface 110b opposed from the first major surface 110a across a thickness $T_W$ of the waveguide 110. The first and second major surfaces 110a, 110b are denominated as being major since those major surfaces 110a, 110b constitute the surfaces of the waveguide 110 with the largest surface areas. In practice, the first and the second major surfaces 110a, 110b are positioned or worn in front of a user's eyes, with a field of vision or view of the user or a line of sight extending generally perpendicularly to the first and second major surfaces 110a, 110b, at least when a gaze of the user is straight ahead. Either or both of the first and the second major surfaces 110a, 110b may be non-planar, for example have one or more radii of curvature about one or more axes that are spaced from the respective first or second major surfaces 110a, 110b, the axes typically spaced on an eye proximate side of the waveguide 110.

The waveguide 110 is at least partially embedded in the inner volume 102 of lens 101.

Transparent combiner 100a, 100b further includes one or more layers of a low index of refraction material 105a, 105b. The layers of a low index of refraction material 105a, 105b serve as at least partial interfaces between the waveguide 110 and the lens 101. In other words, the layers of a low index of refraction material 105a, 105b mediate, either directly or with one or more additional intervening layers, physically coupling between the waveguide 110 and the lens 101. For example a first layer 105a of a low index of refraction material may be positioned or interposed (either on its own or with one or more additional layers) between the first major surface 110a of the waveguide 110 and the first major surface 101a of the lens 101. Also for example a second layer of a low index of refraction material 105b may be positioned or interposed (either on its own or with one or more additional layers) between the second major surface 110b of the waveguide 110 and the second major surface 101b of the lens 101. The low index of refraction material 105a, 105b can take a variety of forms or materials which have an index of refraction of equal to or less than a threshold, such as approximately 1.2. Alternatively, the low index of refraction material 105a, 105b can take a variety of forms or materials where a ratio of an index of the waveguide and an index of refraction of the first layer of low refraction index material is greater than or equal to a threshold, for example approximately 1.8. Approximately as used herein means plus or minus 10% of the stated or nominal value unless expressly stated otherwise.

Waveguide 110 may be a conventional rectangular prism structure formed of a material with an index of refraction that is sufficiently different from that of the low index of refraction material 105a, 105b to enable TIR within planar waveguide 110 for light entering at or greater than a critical angle.

Transparent combiner 100a, 100b optionally includes an in-coupler, for example planar in-coupler 121, carried by (e.g., either directly physically coupled to or indirectly physically coupled to through one or more intervening layers) a first area 111 of waveguide 110 to couple display light into waveguide 110. Similarly, transparent combiner 100a, 100b optionally includes an out-coupler, for example planar out-coupler 122, carried by (e.g., either directly physically coupled to or indirectly physically coupled to through one or more intervening layers) a second area 112 of planar waveguide 110 to couple display light out of waveguide 110. The display light that in-couples through in-coupler 121 and out-couples through the out-coupler 122 may originate from a display light source, such as a projector, a scanning laser projector, a microdisplay, or similar. In use, planar in-coupler 121 receives display light from a display light source and in-couples display light into waveguide 110, and planar out-coupler 122 receives display light from waveguide 110 and out-couples display light into the field of view of the eye of the user. A person of skill in the art will appreciate that additional optics may be employed in between the display light source and in-coupler 121 and/or in between out-coupler 122 and the eye of the user in order to shape the display light for viewing by the eye of the user. FIG. 1A shows the layers of a low index of refraction material 105a, 105b as interposed between waveguide 110 and in-coupler 121 and/or in between waveguide 110 and out-coupler 122. In other implementations, one or both layers of a low index of refraction material 105a, 105b may not extend so far along the length of the waveguide 110, terminating short of the in-coupler 121 and/or out-coupler 122. In still other implementations, either or both of in-coupler 121 and/or out-coupler 122 may be interposed between waveguide 110 and at least an outermost surface of one of the layers of low refractive index material 105a, 105b such that one or both layers of a low index of refraction material 105a, 105b is interposed between in-coupler 121/out-coupler 122 and lens 101. For example, FIG. 1B shows in-coupler 121 and out-coupler 122 interposed or underlying the second layer of a low index of refraction material 105b.

A simplified representative example of a path of display light through planar waveguide 110 is illustrated by the arrows in FIGS. 1A and 1B.

Throughout this specification and the appended claims, the term "waveguide" is used in a general sense to refer to a transparent optical structure through the inner volume of which display light received at or greater than a critical angle is propagated by TIR. Unless the specific context requires otherwise, the term "waveguide" is not meant to impart or require any features or limitations with respect to the wave nature of light (e.g., "single mode waveguide") and should be understood to be interchangeable with related terms for functionally similar structures known in the field of optics, such as "light guide" or "light pipe."

Throughout this specification and the appended claims, the terms "in-coupler" and "out-coupler" are generally used to refer to any type of optical grating structure, including without limitation: diffraction gratings, holograms, holographic optical elements (e.g., optical elements employing one or more holograms), volume diffraction gratings, volume holograms, surface relief gratings, and/or surface relief holograms. Depending on the specific implementation (e.g., depending on the specific position of the in-coupler or out-coupler), the in-couplers/out-couplers herein may be of the transmission type (meaning they allow the display light to transmit therethrough and apply their designed optical function(s) to the light during such transmission) in which case they are referred to as "transmission in-/out-couplers," or they may be of the reflection type (meaning they reflect the display light and apply their designed optical function(s) to the light during such reflection) in which case they are referred to as "reflection in-/out-couplers." In the illustrated implementations of FIGS. 1A and 1B, in-coupler 121 and out-coupler 122 are both transmission gratings positioned at respective areas 111, 112 along an outer surface 130 of waveguide 110; however, in alternative implementations either or both of in-coupler 121 and/or out-coupler 122 may be a transmission grating positioned along an inner surface 132 of waveguide 110 and/or either or both of in-coupler 121 and/or out-coupler 122 may be a refraction grating (in the latter case, a refraction grating would be positioned along or on an inner/outer surface of waveguide 110 that is opposite the surface upon which gratings 121, 122 are illustrated in FIG. 1, across a thickness $T_W$ of waveguide 110).

In the illustrated implementation of FIGS. 1A and 1B, in-coupler 121 and out-coupler 122 are shown as separate, discrete structures. In alternative implementations, in-coupler 121 and out-coupler 122 may be separate areas or regions of a single continuous structure. For example, in implementations in which in-coupler 121 and out-coupler 122 are both holographic optical elements, a single layer of photopolymer material may be carried by a surface of waveguide 110 with at least one in-coupler hologram recorded in the layer of photopolymer material at the region or area corresponding to the position of in-coupler 121 and at least one out-coupler hologram recorded in the layer of photopolymer material at the region or area corresponding to the position of out-coupler 122. In this implementation, a layer of low refractive index material (e.g., 105b) may be interposed between the single layer of photopolymer material and the waveguide (110) to provide a waveguide:low refractive index material:photopolymer:lens stack, or alternatively a layer of low refractive index material (e.g., 105b) may be interposed between the single layer of photopolymer material and the lens (101) to provide a waveguide:photopolymer:low refractive index material:lens stack. In either case, the layer of low refractive index material (e.g., 105b) is interposed between the waveguide (110) and the lens (101) to facilitate TIR.

In the illustrated implementation of FIGS. 1A and 1B, waveguide 110 is completely embedded in the inner volume 102 of lens 101, meaning that all surfaces of waveguide 110 are fully enclosed by the material of lens 101, which is illustrated as a curved lens. In alternative implementations, a waveguide may be only partially embedded or contained within the inner volume 102 of a lens.

Figure 2:
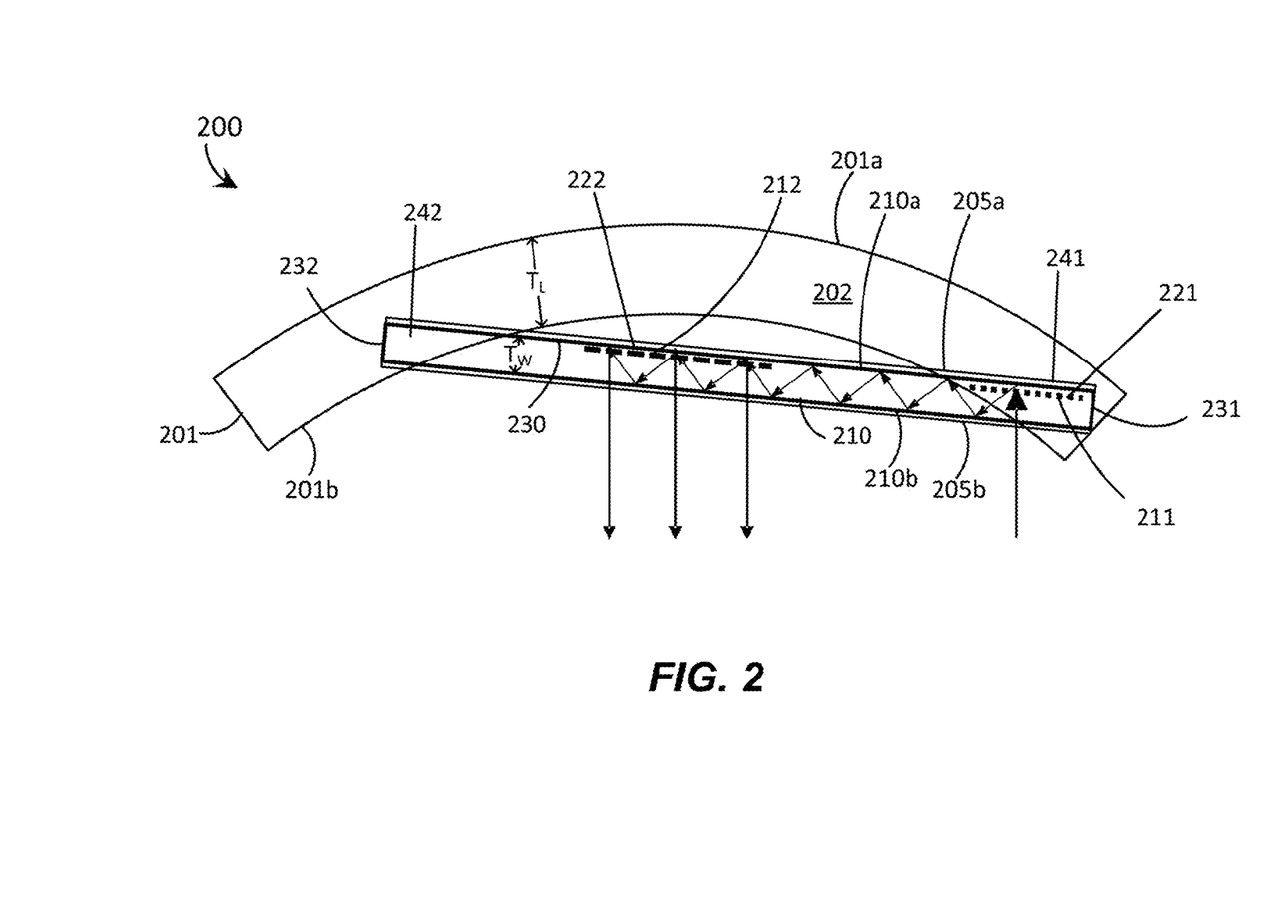
FIG. 2 is a sectional view showing a transparent combiner for use in a wearable heads-up display in accordance with another illustrated implementation of the present systems, devices, and methods.

FIG. 2 shows another transparent combiner 200 for use in a WHUD in accordance with the present systems, devices, and methods. Transparent combiner 200 is similar in some respects to transparent combiner 100a, 100b from FIGS. 1A and 1B in that transparent combiner 200 includes a lens, for example a curved eyeglass lens 201 and a waveguide, for example a planar waveguide 210 with an in-coupler 221 coupled to a first area 211 thereof and an out-coupler 222 coupled to a second area 212 thereof. In contrast to the implementations of FIGS. 1A and 1B, in transparent combiner 200 of FIG. 2 planar waveguide 210 is not completely embedded in the inner volume 202 of curved eyeglass lens 201. Instead, planar waveguide 210 has a first end 231 physically embedded in a first region 241 (e.g., physically coupled to a first point in first region 241) of curved eyeglass lens 210 and a second end 232 (opposite first end 231 across a length of planar waveguide 210) physically embedded in a second region 242 (e.g., physically coupled to a second point in second region 242) of curved eyeglass lens 201. In this way, planar waveguide 210 forms a kind of "bridge" across regions 241 and 242 on a curved surface of curved eyeglass lens 201. In the illustrated implementation of FIG. 2, in-coupler 221 and out-coupler 222 are both reflection gratings positioned on respective areas 211, 212 of an inner surface 230 of planar waveguide 210.

Transparent combiner 200 further includes one or more layers of a low index of refraction material 205a, 205b. The layers of a low index of refraction material 205a, 205b serve as interfaces (either directly or in combination with one or more additional intervening layers) between the waveguide 210 and the lens 201. For example a first layer 205a of a low index of refraction material may be positioned or interposed between the first major surface 210a of the waveguide 210 and the first major surface 201a of the lens 201. Also for example a second layer of a low index of refraction material 205b may be positioned or interposed between the second major surface 210b of the waveguide 210 and the second major surface 201b of the lens 201. The low index of refraction material 205a, 205b can take a variety of forms or materials which have an index of refraction of equal to or less than a threshold, such as approximately 1.2. Alternatively, the low index of refraction material 205a, 205b can take a variety of forms or materials where a ratio of an index of the waveguide and an index of refraction of the layer of low refraction index material is greater than or equal to a threshold, for example approximately 1.8. Approximately as used herein means plus or minus 10% of the stated or nominal value unless expressly stated otherwise.

A simplified representative example of a path of display light through planar waveguide 210 is illustrated by the arrows in FIG. 2.

In FIGS. 1A and 1B, planar waveguide 110 is completely embedded within an inner volume of curved eyeglass lens 101, but planar waveguide 110 only extends across a portion of a total width of curved eyeglass lens 101. This is perfectly acceptable for some applications; however, an end 141 of planar waveguide 110 within the inner volume 102 of curved eyeglass lens 101 can produce a seam that may be visible to the user and/or other people in close proximity to the user. Such a seam can be undesirable in applications where aesthetics of the WHUD are particularly important. In order to prevent the formation/presence of such a visible seam, the length of the planar waveguide may be extended across the full width of the curved eyeglass lens. Such a configuration requires that the curvature and thickness of the curved eyeglass lens provide an inner volume capable of accommodating a planar structure across its full width.

Throughout this specification and the appended claims, the term "full width" is used in a loose sense to generally refer to "at least 90% of the total width."

Figure 3:
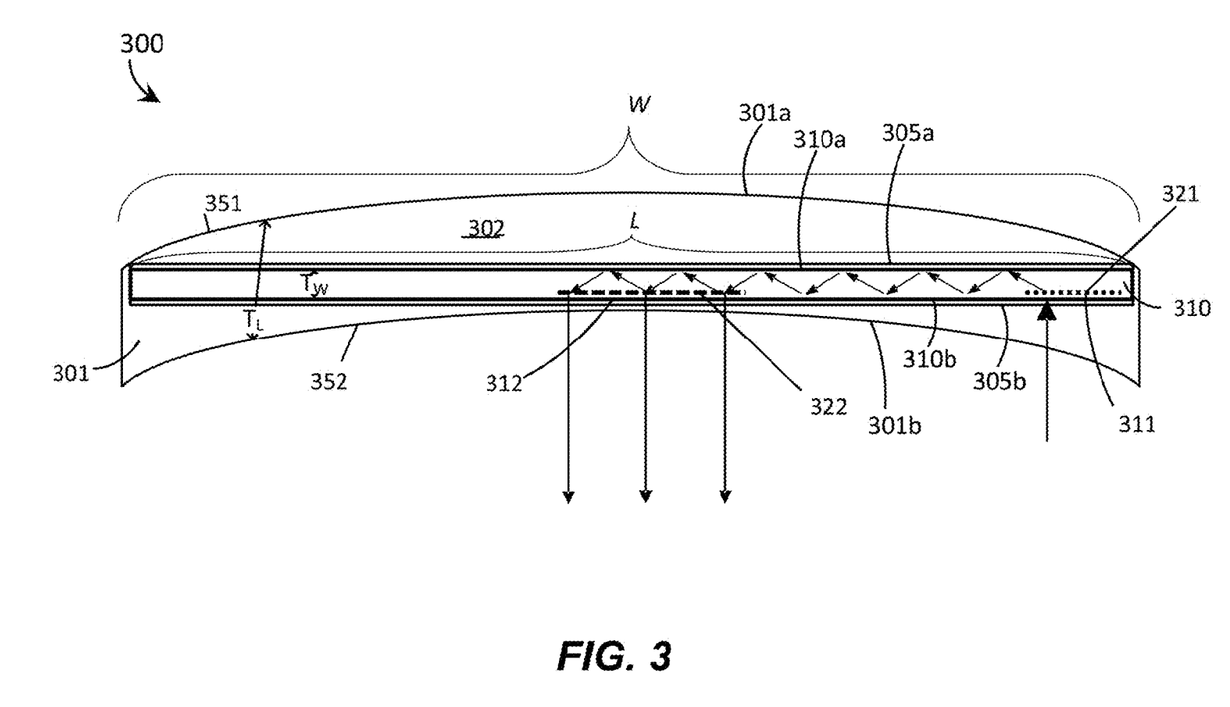
FIG. 3 is a sectional view showing a transparent combiner for use in a wearable heads-up display in accordance with another illustrated implementation of the present systems, devices, and methods.

FIG. 3 shows another transparent combiner 300 for use in a WHUD in accordance with the present systems, devices, and methods. Transparent combiner 300 is similar in some respects to transparent combiner 100a, 100b from FIGS. 1A and 1B in that transparent combiner 300 includes a lens, for example a curved eyeglass lens 301 with a waveguide, for example a planar waveguide 310 completely embedded in the inner volume 302 thereof, and with planar waveguide 310 including an in-coupler 321 coupled to a first area 311 thereof and an out-coupler 322 coupled to a second area 312 thereof. In contrast to the implementations of FIGS. 1A and 1B, in transparent combiner 300 of FIG. 3 a length L of planar waveguide 310 extends across a full width W of curved eyeglass lens 301. As previously described, this configuration helps prevent seams corresponding to the edges or ends of planar waveguide 310 from being visible in the inner volume 302 of curved eyeglass lens 301. A further benefit of this implementation is that it provides greater flexibility for where planar out-coupler 322 is positioned within the field of view of the user. In the illustrated example of FIG. 3, the second area 312 of planar waveguide 310 to which planar out-coupler 322 is physically coupled is positioned at or proximate a center of curved eyeglass lens 301 such that display light (represented by arrows in FIG. 3) generally appears in the user's field of view when the user is gazing straight ahead.

Transparent combiner 300 further includes one or more layers of a low index of refraction material 305a, 305b. The layers of a low index of refraction material 305a, 305b serve as interfaces (either directly or in combination with one or more additional intervening layers) between the waveguide 310 and the lens 301. For example a first layer 305a of a low index of refraction material may be positioned or interposed between the first major surface 310a of the waveguide 310 and the first major surface 301a of the lens 301. Also for example a second layer of a low index of refraction material 305b may be positioned or interposed between the second major surface 310b of the waveguide 310 and the second major surface 301b of the lens 301. The low index of refraction material 305a, 305b can take a variety of forms or materials which have an index of refraction of equal to or less than a threshold, such as approximately 1.2. Alternatively, the low index of refraction material 305a, 305b can take a variety of forms or materials where a ratio of an index of the waveguide and an index of refraction of the layer of low refraction index material is greater than or equal to a threshold, for example approximately 1.8. Approximately as used herein means plus or minus 10% if the stated or nominal value unless expressly stated otherwise.

Depending on the particular needs of the user, curved eyeglass lens 301 may be a prescription eyeglass lens (i.e., if the user typically requires corrective lenses) or a non-prescription/"plano" eyeglass lens (i.e., if the user typically does not require corrective lenses). In either case, eyeglass lens 301 is advantageously curved for at least aesthetic purposes. Furthermore, at least two surfaces of eyeglass lens 301 are advantageously curved.

Eyeglass lens 301 includes a world-side surface 351 and an eye-side surface 352. When transparent combiner 300 is mounted in a WHUD system (e.g., in an eyeglasses frame) and worn on the head of the user, world-side surface 351 faces outward from the user towards the user's environment and eye-side surface 352 faces inward towards the eye of the user. The curvature of eyeglass lens 301 is such that world-side surface 351 is a convex surface and eye-side surface 352 is a concave surface. In implementations for which eyeglass lens 301 is a prescription eyeglass lens, either or both of convex world-side surface 351 and/or concave eye-side surface 352 may embody a curvature that imparts an optical function on environmental light that is transmitted through eyeglass lens 301. When convex world-side surface 351 embodies a curvature that imparts an optical function (e.g., optical power) on environmental light passing therethrough, out-coupler 322 may advantageously be designed, configured, positioned, and/or oriented to apply a compensatory optical function to display light that is out-coupled by out-coupler 322. Generally, the compensatory optical function applied by out-coupler 322 may be matched (i.e., at least approximately equal to within 20% or less) to the optical function of convex world-side surface 351 of curved eyeglass lens 301. In other words, out-coupler 322 is generally operable to out-couple display light from planar waveguide 310, and in doing so, out-coupler 322 may be further operable to apply a compensatory optical function to the display light in order to cause the display light to appear as though it has passed through convex world-side surface 351 even though the display light has not passed through convex world-side surface 351 but rather has propagated through planar waveguide 310 at least partially embedded in the inner volume 302 of eyeglass lens 301.

Figure 4:
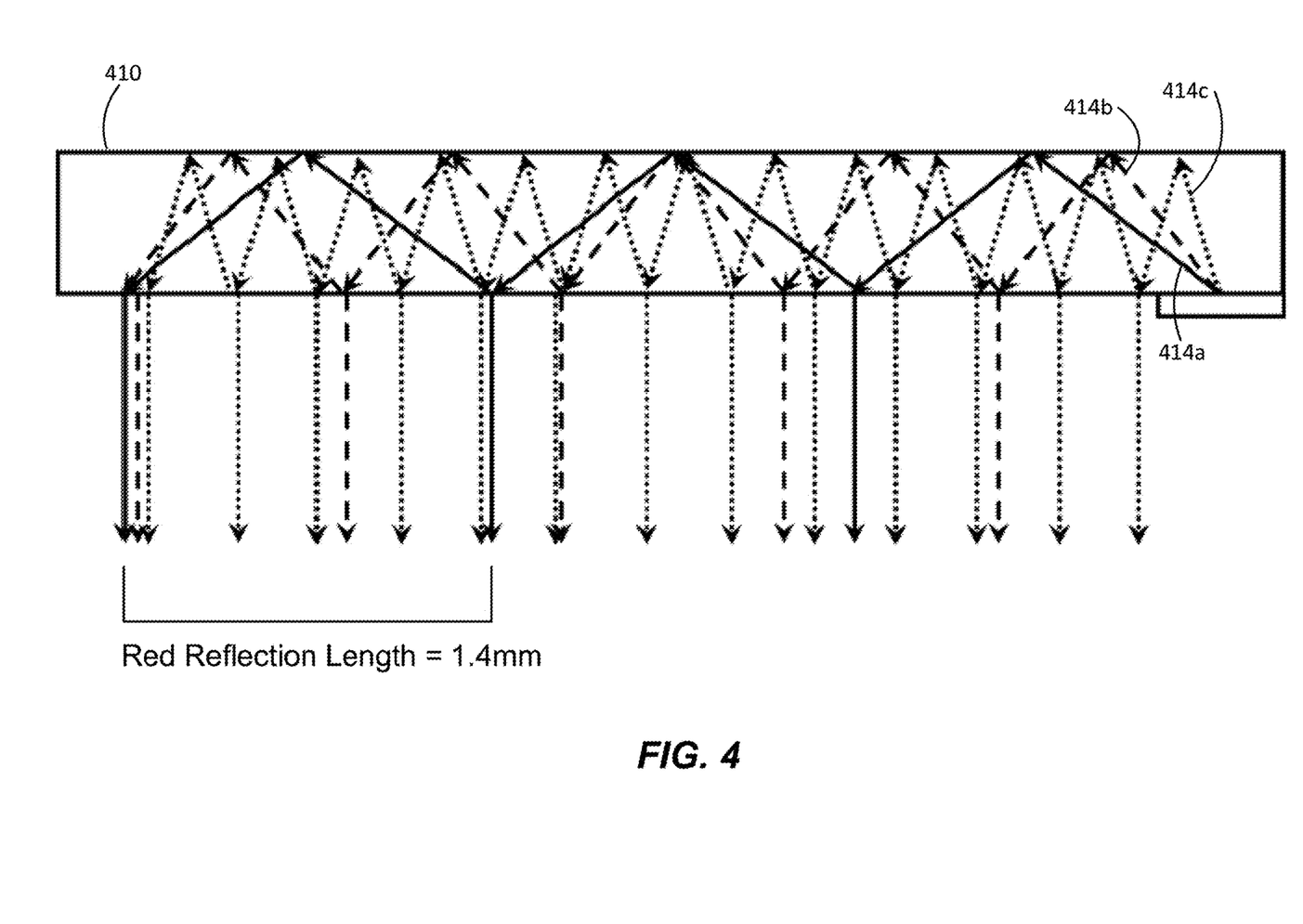
FIG. 4 shows a simplified representative example of a path of each of three different colors (i.e., wavelengths) of display light (e.g., red, green, blue) through a waveguide in accordance with the present systems, devices, and methods.

FIG. 4 shows a simplified representative example of a path of each of three different colors (i.e., wavelengths) of display light (e.g., red, green, blue) through a waveguide 410 in accordance with the present systems, devices, and methods.

In at least some implementations a source may emit light of two or more different colors. In many instances, any nominal color will be composed of a band of wavelengths that generally center around a wavelength commonly associated with that color. There may in fact be no hard break or separation between bands of colors. In the illustrated example, a single waveguide receives, propagates by TIR, and emits light of three colors, e.g., red as illustrated by solid arrow 414a, green as illustrated by large broken line arrow 414b, and blue as illustrated by small broken line arrow 414c.

Each wavelength of light reflects in the waveguide at different respective angles as compared to other wavelengths. For example, wavelengths associated with or characterized as blue reflect at relatively smaller angles than wavelengths associated with or characterized as green or red. Likewise, wavelengths associated with or characterized as red reflect at larger angles than wavelengths associated with or characterized as blue or green. Wavelengths associated with or characterized as green reflect at larger angles than wavelengths associated with or characterized as blue and reflect at smaller angles than wavelengths associated with or characterized as red. Consequently, over a given length along the waveguide (e.g., to longitudinally traverse from a location A to a location B), wavelengths of blue light will reflect more times than wavelengths of red light. Thus, each color therefore has its own "reflection length" (i.e., a distance between reflections from a same side of the waveguide.

A maximum reflection length is set, for example, as a red reflection length of 1.4 mm. The selection of 1.4 mm corresponds to a largest desired separation between separate instances of a same pixel impinging on an eye of a user, to ensure that at least one instance of the pixel enters the pupil of the eye for all pupil positions within an eyebox of the system. For example, if the separation were greater than 1.4 mm and the environment was very bright, the user's pupil might shrink or constrict to be so small that the constricted pupil could fit in between instances of "red" in FIG. 4, which would mean the user would only see green and blue and not red until their eye moved or their pupil grew or dilated.

Given a defined maximum reflection length of 1.4 mm, there remain at least three variables that influence TIR: material for the waveguide (i.e., index of refraction for light guide represented as n(waveguide)), thickness of the waveguide (directly relates to reflection length), and an angle introduced by the in-coupler. The material, refractive index, and nature of the in-coupler/out-coupler may also influence TIR. The material available to select from for the waveguide may be limited. Additionally, a thickness of the waveguide is constrained since the waveguide should be as thin (e.g., approximately 0.3 mm) as possible to allow integration in a curved lens.

For a particular in-coupler/out-coupler configuration, given a fixed n(waveguide), 0.3 mm thickness, and maximum reflection length of 1.4 mm, this sets a bound on the index of refraction for the low index material represented as n(low index material); that is, the low index material should have a n(low index material) less than or equal to 1.2, or less than or equal to approximately 1.2. Alternatively, a ratio of an index of refraction of the waveguide to an index of refraction of a low index of refraction material (i.e., ratio n(waveguide):n(low index material)) is greater than or equal to 1.8.

Figure 5:
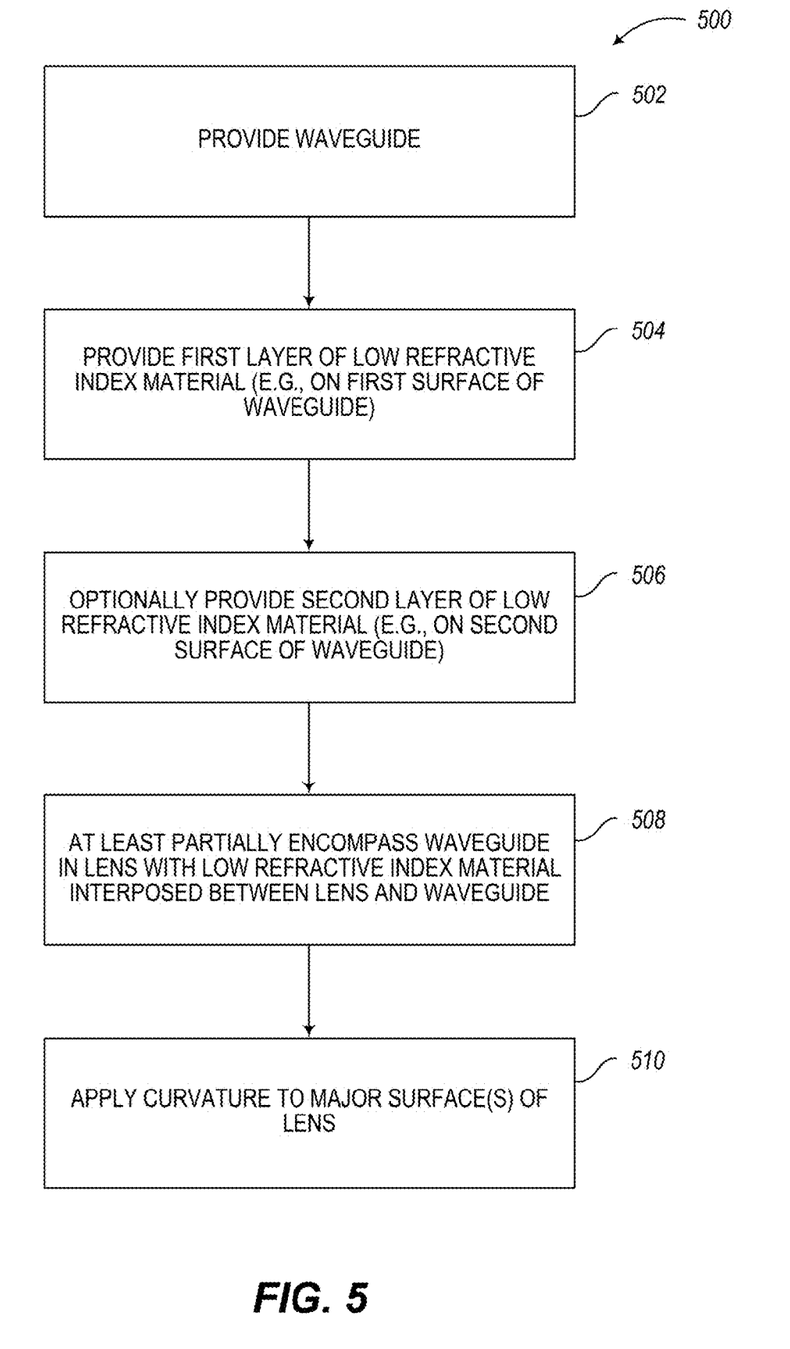
FIG. 5 shows a method of producing a transparent combiner, in accordance with the present systems, devices, and methods.

FIG. 5 shows a method 500 of producing a transparent combiner, in accordance with the present systems, devices, and methods. The transparent combiner may be used in or incorporated into a wearable heads-up display.

At 502, a waveguide is provided, the waveguide having a first major surface and at least a second major surface, the second major surface of the waveguide opposed from the first major surface of the waveguide across a thickness of the waveguide.

At 504, a first layer of a low refractive index material is provided. Providing a first layer of a low refractive index material may include providing the first layer of the low refractive index material on (either directly or inclusive of one or more intervening layers of, for example, other material(s) such as in-coupler/out-coupler material) at least a portion of the first major surface of the waveguide. The low refractive index material may be provided in any variety of forms and manners. For example, the low refractive index material may be sprayed, rolled, coated, dipped, dispensed, painted or otherwise deposited on (either directly or inclusive of one or more intervening layers of other material(s)) a portion or all of the first major surface of the waveguide. The low refractive index material may be deposited as a sol or colloidal suspension. The sol or colloidal suspension may be evolved to a gel, for example by allowing sedimentation to occur. The sedimented sol or colloidal suspension may then be dried (e.g., via exposure to heat). Alternatively, the sedimented sol or colloidal suspension may then be polymerized, for example via exposure to certain heat, a reagent, or wavelengths of electromagnetic energy.

Optionally at 506, a second layer of a low refractive index material is provided. Providing a second layer of a low refractive index material may include providing the second layer of the low refractive index material on (either directly or inclusive of one or more intervening layers of, for example, other material(s) such as in-coupler/out-coupler material) at least the portion of the second major surface of the waveguide. Alternatively, the second layer of a low refractive index material may be omitted. As a further alternative, an entire waveguide may be coated, dipped, or otherwise deposited with a low refractive index material that may cover at least a respective portion of both major surfaces of the waveguide, as well as possibly other portions of the waveguide.

At 508, the waveguide is at least partially encompassed in a lens, the lens having a first major surface and a second major surface, the second major surface of the lens opposed from the first major surface of the lens across a thickness of the lens, with the first layer of a low refractive index material interposed between at least a portion of the first major surface of the lens and at least a portion of the first major surface of the waveguide. Encompassing the waveguide in a lens may include molding the waveguide partially or fully in an interior or inner volume of the lens. Encompassing the waveguide in a lens may include applying an optically transparent adhesive to adhere the waveguide to one or more surfaces.

At 510, a curvature is applied to at least one of the first or the second major surfaces of the lens to impart at least one of a positive optical power or a negative optical power to the lens. In some instances, a first curvature or first set of curvatures is applied to the first major surface of the lens (e.g., convex) and either no curvature or a second curvature or second set of curvatures is applied to the second major surface of the lens, the second curvature or second set of curvatures different from the first curvature or first set of curvatures. Curvatures can be applied by molding, casting, grinding, or a combination of molding or casting to create blanks and grinding the blanks. In implementations in which the lens is molded and encompassing the waveguide in a lens at 508 includes molding the waveguide partially or fully in an interior or inner volume of the lens, then acts 508 and 510 may be completed substantially simultaneously in the molding process.

The various embodiments described herein generally provide systems, devices, and methods for at least partially embedding at least a portion of a waveguide in at least a portion of an inner volume of a lens. Such embedding may be achieved using a variety of different processes and techniques depending on the requirements of the specific implementation. For example, at least a portion of a waveguide may be at least partially embedded in at least a portion of a lens by a molding/casting process in which the at least a portion of the waveguide to be embedded in the lens is positioned in a mold and the mold is then filled with a liquid material (e.g., resin) via an injection process. The liquid material may then be cured to form the rigid structure of the lens and the removed from the mold. Alternatively, at least a portion of a waveguide may be at least partially embedded in at least a portion of a lens by a lamination process, or by sandwiching together two halves (more generally, "portions") of the eyeglass lens around the waveguide using an optically transparent adhesive.

Implementations of the present systems, devices, and methods that involve lens casting/molding and/or that embed physical structures (e.g., waveguide 110) in the inner volume of a lens may do so using the systems, methods, and devices described in US Patent Application Publication No. 2017-0068095, U.S. Provisional Patent Application Ser. No. 62/534,099, and/or U.S. Provisional Patent Application Ser. No. 62/565,677.

As previously described, U.S. Provisional Patent Application Ser. No. 62/482,062; U.S. Non-Provisional patent application Ser. No. 15/946,594; U.S. Non-Provisional patent application Ser. No. 15/167,458 (now US Patent Application Publication No. US 2016-0349514 A1), U.S. Non-Provisional patent application Ser. No. 15/167,472 (now US Patent Application Publication No. US 2016-0349515 A1), U.S. Non-Provisional patent application Ser. No. 15/167,484 (now US Patent Application Publication No. US 2016-0349516 A1), US Patent Application Publication No. US 2016-0377865 A1, US Patent Application Publication No. US 2016-0377866 A1, and US Patent Application Publication No. US 2016-0238845 A1 all describe WHUD architectures that are well-suited to be adapted to use the transparent combiners 100a, 100b, 200, and/or 300 described in the present systems, devices, and methods. A general example of such a WHUD is depicted in FIG. 6.

Figure 6:
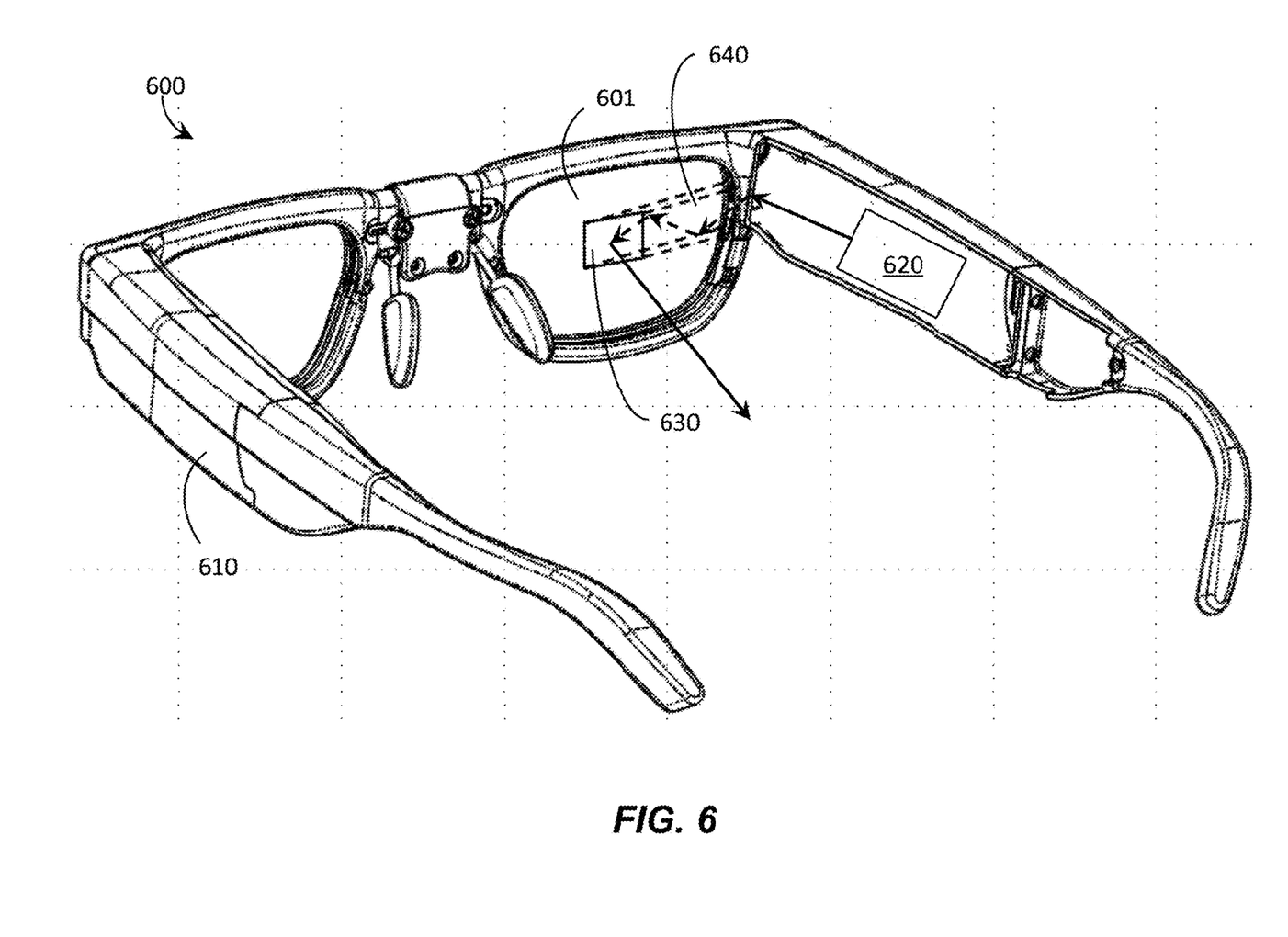
FIG. 6 is an illustrative diagram showing an example of a wearable heads-up display employing a curved transparent combiner in accordance with an illustrated implementation of the present systems, devices, and methods.

FIG. 6 is an illustrative diagram showing an example of a WHUD 600 employing a curved transparent combiner 601 in accordance with an embodiment of the present systems, devices, and methods. WHUD 600 generally includes a support structure 610 that has the shape/geometry of a pair of eyeglasses and in use is worn on the head of the user. Support structure 610 carries a display light source 620 (e.g., a laser projector or a microdisplay, which may or may not be at least partially contained within an inner volume of support structure 610) and also carries curved transparent combiner 601 which is positioned in a field of view of an eye of the user when support structure 610 is worn on the head of the user. Curved transparent combiner 601 may include any of transparent combiner 100a, 100b from FIGS. 1A and 1B, transparent combiner 200 from FIG. 2, transparent combiner 300 from FIG. 3, or any combination or variation thereof. Generally, transparent combiner 601 is shown as a curved eyeglass lens including a waveguide portion 640 (shown in dashed lines to indicate that it may not actually be visible to the user), one or more layers of a low refractive index material, and an out-coupler 630. A representative optical path of light from display light source 620 is illustrated with arrows in FIG. 6. The display light leaves source 620 and enters waveguide 640 of transparent combiner 601 (e.g., through an in-coupler, not visible in the view of FIG. 6), where it is totally internally reflected until it reaches out-coupler 630, from whence it emerges and is directed towards the eye of the user (with a compensatory optical function applied thereto in some cases, as previously described).

In some implementations, a waveguide may terminate at the out-coupler because there is no desire to propagate light within the waveguide beyond that point. However, as previously described, this can result in a visible seam within or upon the eyeglass lens where the waveguide ends. In order to avoid this seam, in some implementations, a waveguide may be extended beyond the out-coupler to the far edge of a lens even though there is no intention to propagate light within the waveguide beyond the out-coupler (as illustrated in FIG. 3).

In some implementations, a refractive index barrier (i.e., a material having an intermediate refractive index) may be employed in between an in-coupler/out-coupler and any lens/waveguide material in order to enable light to couple between the in-coupler/out-coupler and the lens/waveguide material.

In some implementations, an air gap may be included to separate the surfaces of the planar waveguide from the surfaces of the curved eyeglass lens and achieve a maximum difference in the refractive index across the interface of the planar waveguide. In other words, air gaps may be used to deliberately separate the TIR surfaces of the planar waveguide (i.e., the surfaces of the planar waveguide from which display light is totally internally reflected in use) from the curved eyeglass lens material (i.e., no physical contact therebetween) to maximize the change in refractive index at the surface of the planar waveguide and facilitate TIR. In other implementations, a low-refractive index coating may be applied to the TIR surface(s) of the planar waveguide instead of an air gap.

Some of the waveguides or in-couplers/out-couplers described herein may introduce optical distortions in displayed images. In accordance with the present systems, devices, and methods, such optical distortions may be corrected (i.e., compensated for) in the software that drives the display engine. For example, the geometrical output of the transparent combiner may be measured without any compensation measure in place and a reverse transform of such output may be applied in the generation of light by the display light source.

The relative positions of waveguides within lenses/combiners shown herein are used for illustrative purposes only. In some implementations, it may be advantageous for a waveguide to be positioned centrally within a combiner, whereas in other implementations it may be advantageous for a waveguide to be positioned off-center. In particular, it may be advantageous for a waveguide to couple to the corner of the support structure/glasses frame where the temple of the glasses frame meets the rims, because this is an advantageous location to route display light from a scanning laser projector or microdisplay with minimal impact on form factor.

The various embodiments described herein generally reference a single eye of a user (i.e., monocular applications), but a person of skill in the art will readily appreciate that the present systems, devices, and methods may be duplicated in a WHUD in order to provide binocular applications.

The WHUDs described herein may include one or more sensor(s) (e.g., microphone, camera, thermometer, compass, and/or others) for collecting data from the user's environment. For example, one or more camera(s) may be used to provide feedback to the processor of the wearable heads-up display and influence where on the transparent display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

The waveguides described herein may employ any of the systems, devices, and/or methods described in U.S. Provisional Patent Application Ser. No. 62/525,601, U.S. Provisional Patent Application Ser. No. 62/557,551, U.S. Provisional Patent Application Ser. No. 62/557,554, and/or U.S. Provisional Patent Application Ser. No. 62/573,978.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: U.S. Non-Provisional patent application Ser. No. 15/946,549, U.S. Non-Provisional patent application Ser. No. 15/167,458 (now US Patent Application Publication No. US 2016-0349514 A1), U.S. Non-Provisional patent application Ser. No. 15/167,472 (now US Patent Application Publication No. US 2016-0349515 A1), U.S. Non-Provisional patent application Ser. No. 15/167,484 (now US Patent Application Publication No. US 2016-0349516 A1), US Patent Application Publication No. US 2016-0377865 A1, US Patent Application Publication No. US 2016-0377866 A1, US Patent Application Publication No. US 2016-0238845 A1, US Patent Application Publication No. 2017-0068095, U.S. Provisional Patent Application Ser. No. 62/534,099, U.S. Provisional Patent Application Ser. No. 62/565,677, U.S. Provisional Patent Application Ser. No. 62/525,601, U.S. Provisional Patent Application Ser. No. 62/557,551, U.S. Provisional Patent Application Ser. No. 62/557,554, and U.S. Provisional Patent Application Ser. No. 62/573,978 are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wearable heads-up display (WHUD) comprising:
a support structure that in use is worn on a head of a user;
a display light source to provide display light, wherein the display light source includes a first source of a red light, a second source of a green light and a third source of a blue light; and a transparent combiner carried by the support structure and positioned in a field of view of an eye of the user when the support structure is worn on the head of the user, the transparent combiner oriented to receive the red light, the green light, and the blue light from the display light source, and the transparent combiner comprising:
- a lens having a first major surface and a second major surface, the second major surface of the lens opposed from the first major surface of the lens across a thickness of the lens, at least one of the first or the second major surfaces of the lens having a curvature that imparts at least one of a positive optical power or a negative optical power;
- a planar waveguide having a first major surface and at least a second major surface, the second major surface of the planar waveguide opposed from the first major surface the planar waveguide across a thickness of the planar waveguide, the thickness of the planar waveguide less than or equal to 0.3 mm, the planar waveguide to propagate each of the red light, the green light, and the blue light therethrough by total internal reflection; and
- a first layer of a low reflective index material located between at least a portion of the first major surface of the lens and at least a portion of the first major surface of the planar waveguide, wherein a ratio of a refractive index of the planar waveguide and a refractive index of the first layer of the low refractive index material is greater than or equal to 1.8 to provide a maximum reflection length of less than or equal to 1.4 mm for the red light inside the planar waveguide.

2. The WHUD of claim 1 wherein the transparent combiner further comprises:
a second layer of the low refractive index material located between at least a portion of the second major surface of the lens and at least a portion of the second major surface of the planar waveguide.

3. The WHUD of claim 1 wherein the waveguide is completely embedded in the lens.

4. The WHUD of claim 1 wherein a refractive index of the low refractive index material is less than or equal to 1.2.

5. The WHUD of claim 1 wherein the first layer of the low refractive index material is a gel or a sol.

6. The WHUD of claim 1 wherein the first layer of the low refractive index material is a sol-gel.

7. The WHUD of claim 1 wherein the first layer of the low refractive index material is an adhesive material.

8. The WHUD of claim 1 wherein the first layer of the low refractive index material completely covers the first major surface of the lens.

9. The WHUD of claim 1, further comprising:
a planar in-coupler carried by a first area of the planar waveguide; and
a planar out-coupler carried by a second area of the planar waveguide.

10. The WHUD of claim 9 wherein the planar in-coupler and the planar out-coupler are each selected from a group consisting of: a hologram, a holographic optical element, a volume diffraction grating, a surface relief diffraction grating, a transmission grating, and a reflection grating.

11. The WHUD of claim 9 wherein the first area of the planar waveguide by which the planar in-coupler is carried is an area on the first major surface of the planar waveguide which is an outer surface of the planar waveguide and the second area of the planar waveguide by which the planar out-coupler is carried is an area on the second major surface of the planar waveguide which is an inner surface of the planar waveguide.

12. The WHUD of claim 9 wherein the planar waveguide includes a first end and a second end opposite the first end across a length of the planar waveguide, and wherein the first end of the planar waveguide is physically embedded in a first region of the lens and the second end of the planar waveguide is physically embedded in a second region of the lens.

13. The WHUD of claim 9 wherein the planar out-coupler is operable to out-couple display light from the planar waveguide through the second major surface of the lens, and wherein the planar out-coupler is positioned and oriented to apply a compensatory optical function to display light when the planar out-coupler out-couples display light from the planar waveguide through the second major surface of the lens, the compensatory optical function matched to an optical function of the first major surface of the lens.

14. The WHUD of claim 9 wherein the second area of the planar waveguide by which the planar out-coupler is carried is positioned at or proximate a center of the lens.

15. The WHUD of claim 9 wherein both the planar in-coupler and the planar out-coupler are interposed between the first layer of the low refractive index material and the first major surface of the lens.

16. The WHUD of claim 9 wherein both the planar in-coupler and the planar out-coupler are interposed between the first layer of the low refractive index material and the first major surface of the waveguide.

17. The WHUD of claim 1 wherein the first major surface of the lens includes a convex world-side surface and the second major surface of the lens includes a concave eye-side surface.

18. The WHUD of claim 1 wherein a length of the waveguide extends across a full width of the lens.

* * * * *